United States Patent Office 2,814,609
Patented Nov. 26, 1957

2,814,609

CHLOROSULFONATION OF POLYISOBUTYLENE

Jules Borunsky, Sarnia, Ontario, Canada, assignor to Polymer Corporation Limited, Sarnia, Ontario, Canada, a corporation of Canada No Drawing. Application February 11, 1955,
Serial No. 487,717

Claims priority, application Canada January 7, 1955

10 Claims. (Cl. 260—79.3)

This invention relates to the chlorosulfonation of polyisobutylene.

The curing of elastomers, such as copolymers of butadiene and styrene, copolymers of butadiene and acrylonitrile, copolymers of isobutylene and isoprene, polybutadiene, and natural rubber, is dependent on the chemical reaction that takes place when the polymer is brought into intimate contact with the sulfur, or sulfurizing agent, in the presence of heat, in the usual compounding and curing procedures. It has been found that polyisobutylene does not give a practicable cure by this method because the absence of unsaturations in the polymer makes it difficult for the sulfur to become chemically attached to the polyisobutylene.

In the past, procedures such as the method described in U. S. Patent No. 2,212,786 have been used. In this method the polymer is dissolved in an inert solvent, illuminated by actinic light and reacted with a stream of chlorine plus sulfur dioxide gas which is bubbled through the solution. It has been found that varying amounts of chlorine and sulfur could be attached to the polymer by varying the ratios of the chlorine and sulfur dioxide gas used.

However, it has been found that during the chlorosulfonation of polyisobutylene using these procedures, some degradation of the polymer always occurred.

It is an object of this invention to chlorosulfonate polyisobutylene without the attendant degradation of the polyisobutylene.

The chlorosulfonation of polyisobutylene according to the present invention comprises catalytically reacting the polyisobutylene with sulfuryl chloride in the presence of a salt selected from alkali metal sulfites and alkali metal pyrosulfites.

The most common alkali metal salts used are those of sodium and potassium, so that the usual salts used are sodium sulfite, potassium sulfite, sodium pyrosulfite and potassium pyrosulfite. The usual catalyst will be pyridine, though other sulfonating catalysts may be used.

In practice, the polyisobutylene will generally be dissolved or suspended in a non-reactive solvent, such as carbon tetrachloride, hexachloroethane or carbon disulfide, in a suitable reaction vessel, preferably one fitted with a stirrer, a reflux condenser to prevent the escape of solvent, a thermometer, and means to admit the sulfuryl chloride. After raising the temperature to the desired point by means of a suitable heater, the solution is stirred rapidly while the alkali metal salt is added, either as a powder, or as a suspension or solution in the non-reactive solvent. Half the required amount of sulfuryl chloride is then added along the the catalyst. After an induction period of up to three hours a very vigorous reaction takes place with evolution of sulfur dioxide and chlorine gases. The rest of the required amount of sulfuryl chloride is added after the first surge of gas evolution has subsided. Although illumination of the reacting system by actinic light is not necessary, its presence will increase the reaction rate advantageously. The solution is agitated vigorously throughout the duration of the run in order to blend in more thoroughly the alkali metal salt and sulfuryl chloride during the induction period and, after reaction has started, to provide a more uniform and intimate contact between the sulfur dioxide and chlorine gases and the dissolved polyisobutylene. The agitation also serves to ensure a rapid neutralization by the salts of the acids formed during the chlorosulfonation reaction in order to prevent degradation of the polyisobutylene. In addition, the agitation provides a more uniform distribution of heat and better heat transfer, thus resulting in better temperature control.

The temperature at which the reaction is carried out may be varied from room temperature to as high as the boiling point of the solution, or even higher if the reactor is pressurized; the pressure should not be so high as to liquify any of the unreacted chlorine or sulfur dioxide gases evolved from the reacting medium. A temperature between 40° C. and the boiling point of sulfuryl chloride, i. e. 69.1° C. at atmospheric pressure is satisfactory, but a temperature of from 50°–60° C. and an atmospheric pressure is preferred. At temperatures lower than 50° C. the reaction begins to slow down considerably and more energy is required for agitation of solutions containing high percentages of solids. At temperatures above the boiling point of sulfuryl chloride, the sulfuryl chloride evaporates too quickly effectively to chlorosulfonate the polyisobutylene. In addition, at higher temperatures the polyisobutylene tends to be degraded, as evidenced by the tackiness of the product, so that a temperature of 70° C. is the preferred maximum whatever the pressure used.

The concentration of polymer in solution may vary considerably, but is limited at the higher levels by the necessity for the solution to be fluid enough at all times to allow efficient agitation while the reaction is taking place.

The reaction may continue for as long as twelve hours and, when the reaction has subsided, the chlorosulfonated polyisobutylene is recovered by any suitable method, such as distillation of the solvent, or precipitation of the polyisobutylene.

The following examples are given to illustrate the present invention.

Example I 560 gms. of a 6% solution of polyisobutylene in carbon tetrachloride were stirred rapidly while 28 gms. of sodium sulfite followed by 20 mls. of sulfuryl chloride were added thereto. When no reaction had started after three hours, three drops of pyridine were added to the reaction mixture. The reaction then started immediately and continued for three hours before subsiding. The temperature of the reacting mass was kept at 55° C. The product was purified as follows: The carbon tetrachloride solution was washed ten times with water and was then poured into a large excess of acetone to precipitate the polymer. This precipitated polymer was filtered off and dried. After three such purification cycles the polymer was finally dried and analyzed for chlorine and sulfur.

The final dried polymer was found to contain 2.36% chlorine and 0.76% sulfur. It is known that polyisobutylene containing at least 0.5% sulfur and 1.0% chlorine is satisfactory as a cured elastomer.

Example II 1170 gms. of a 6% solution of polyisobutylene in carbon tetrachloride were stirred rapidly while 2 mls. pyridine, 90 gms. sodium pyrosulfite and 54 mls. sulfuryl chloride were added. The system was illuminated by ultra violet light while maintaining a temperature of 50° C. After an induction period of two hours a vigorous reaction set in with a strong evolution of sulfur dioxide and chlorine gases. The reaction subsided after two hours and the product was purified as described in Example I. The final dried polymer was found to contain 11.1% chlorine and 1.77% sulfur.

*Example III*

560 gms. of a 6% solution of polyisobutylene in carbon tetrachloride were stirred rapidly while 5 mls. pyridine, 13 gms. sodium sulfite and 10 mls. of sulfuryl chloride were added. The temperature was held at 55° C. until the reaction subsided 12 hours later. The chlorosulfonated product was purified as described in Example I, and was found to contain 5.4% chlorine and 0.6% sulfur.

*Example IV*

560 gms. of a 6% solution of polyisobutylene in carbon tetrachloride were stirred rapidly while 5 mls. pyridine, 26 gms. sodium sulfite and 20 mls. sulfuryl chloride were added. The temperature was kept at 55° C. After an induction period of three hours, a 4½ hour reaction took place. The chlorosulfonated product was purified as described in Example I, and found to contain 1.7% sulfur and 10.7% chlorine.

What I claim is:

1. In a process for the chlorosulfonation of polyisobutylene by reacting said polyisobutylene with sulfuryl chloride in the presence of a catalytic amount of pyridine, the improvement comprising effecting such reaction in the presence of a reaction promoter selected from the group consisting of alkali metal sulfites and alkali metal pyrosulfites.

2. A process as claimed in claim 1 which includes assisting the reaction with actinic light.

3. A process as claimed in claim 1 in which said salt is sodium sulfite.

4. A process as claimed in claim 1 in which said salt is sodium pyrosulfite.

5. A process as claimed in claim 1 in which said salt is potassium sulfite.

6. A process as claimed in claim 1 in which said salt is potassium pyrosulfite.

7. A process as claimed in claim 1 in which the temperature of the reaction is 40–70° C.

8. A process for the chlorosulfonation of polyisobutylene which comprises dissolving said polyisobutylene in a non-reactive solvent, and reacting the polyisobutylene solution with sulfuryl chloride in the presence of a pyridine catalyst and a reaction promoting salt selected from the group consisting of alkali metal sulfites and alkali metal pyrosulfites.

9. A process as claimed in claim 8 in which said non-reactive solvent is selected from the group consisting of carbon tetrachloride, hexachloroethane and carbon disulfide.

10. A process for the chlorosulfonation of polyisobutylene which comprises dissolving polyisobutylene in a non-reactive solvent, and reacting the polyisobutylene solution with sulfuryl chloride at 40–70° C. in the presence of pyridine and a reaction promoting salt selected from the group consisting of alkali metal sulfites and alkali metal pyrosulfites.

References Cited in the file of this patent

UNITED STATES PATENTS

| | | |
|---|---|---|
| 2,212,786 | McQueen | Aug. 27, 1940 |
| 2,405,971 | McAlevy | Aug. 20, 1946 |
| 2,586,363 | McAlevy | Feb. 19, 1952 |

FOREIGN PATENTS

| | | |
|---|---|---|
| 444,636 | Great Britain | Mar. 24, 1936 |